United States Patent [19]

Oostenbrink

[11] 3,938,834

[45] Feb. 17, 1976

[54] PIPE CONNECTION FOR PLASTIC PIPES COMPRISING A TRANSVERSELY OR HELICALLY CORRUGATED PIPE-CONNECTING PART

[75] Inventor: Albertus Antony Oostenbrink, Hardenberg, Netherlands

[73] Assignee: Wavin B.V., Zwolle, Netherlands

[22] Filed: Apr. 20, 1973

[21] Appl. No.: 353,080

[52] U.S. Cl. ............ 285/235; 285/334.4; 285/345; 285/369; 285/379; 285/423; 285/DIG. 4
[51] Int. Cl.² ................................... F16L 21/02
[58] Field of Search............ 285/369, 332.2, 332.3, 285/345, 346, 379, 423, DIG. 4, 235

[56] References Cited
UNITED STATES PATENTS

| | | | |
|---|---|---|---|
| 1,922,431 | 8/1933 | Geyer | 285/235 X |
| 3,516,693 | 6/1970 | Glover | 285/235 |
| 3,527,484 | 9/1970 | Walkden | 285/423 X |
| 3,645,547 | 2/1972 | Glover | 285/110 X |
| 3,743,329 | 7/1973 | Wesel, Sr. | 285/423 X |
| 3,796,447 | 3/1974 | de Putter | 285/345 X |

*Primary Examiner*—Werner H. Schroeder
*Assistant Examiner*—Moshe I. Cohen
*Attorney, Agent, or Firm*—Edmund M. Jaskiewicz

[57] ABSTRACT

Pipe connection for plastic pipes comprising two penetrating pipe parts and a receiving pipe part, which is provided with corrugations at each end. The radius of curvature or the height of the corrugations decrease from each end to the centre part of the receiving pipe part.

7 Claims, 2 Drawing Figures

PIPE CONNECTION FOR PLASTIC PIPES COMPRISING A TRANSVERSELY OR HELICALLY CORRUGATED PIPE-CONNECTING PART

DISCUSSION OF THE PRIOR ART:

My invention relates to a pipe connection for plastic pipes comprising at least one penetrating pipe part and a pipe receiving part of plastics receiving the penetrating pipe part or parts, while the pipe receiving part is provided with a space, situated in the vicinity of its penetrating end, in which sealing means are accommodated.

Pipe connections in which the pipe-connecting part consists of a sleeve are commonly known. These sleeves should however, be manufactured by means of injection moulding, while they moreover should have a minimal thickness in order to be capable of absorbing the stresses produced.

It is obvious that as a consequence those pipe connections are rather expensive owing to the application of expensive pipe-connecting parts.

Similar objections hold for pipe connections comprising a penetrating pipe part and a receiving widened end of another pipe.

SUMMARY OF THE INVENTION:

My invention now aims to provide a pipe connection of the aforementioned type which has not the drawbacks mentioned hereinbefore, while a receiving part with a rather small wall thickness suffices without any risk of deformation of the receiving parts.

This according to the invention is achieved by the arrangement that the receiving part has at least two transversal or helical corrugations besides the space or spaces while as seen from each recieving end of the receiving part the surface area of the cross section of the corrugations decrease. The surface area of a corrugation is the area of the figure enclosed by the circumference of the cross section of a corrugation and its elongation and the part of the longitudinal axis situated between the two intersection points of the elongation of said circumference with said longitudinal axis.

The difference in surface area can be obtained by means of corrugations having a different radius of curvature and or a different height, the different radius of curvature now being preferred.

One has found that when identical transverse or helical corrugations are applied, the receiving part will show the flow effect "or deformation" at the first corrugation besides the receiving end in case of some angular displacement of the receiving part with respect to the penetrating pipe part. This phenomenon does not occur when a receiving part according to present invention is applied.

When the receiving part is exposed to tensions the outer larger corrugation(s) will easier deform than the inner, smaller ones.

Preferably three transverse or helical corrugations are provided near said penetrating end, their radius of curvature and or height decreasing from the penetrating end of the receiving part. The hollows between consecutive corrugations decrease likewise in an efficient way.

According to a preferred embodiment the crests of the transverse or helical corrugations, preferably three, are lying on a truncated cone surface having its greatest circumference, at the penetrating end, provided with the locking ring.

My invention relates likewise to a receiving part adapted to application with a pipe connection as hereinbefore described.

The receiving part and the pipe connection consist preferably of polyvinylchloride, polyethylene, polypropylene or ABS material.

According to a preferred embodiment the receiving part consists of a pipe connecting part with an inner abutment edge and at least two corrugations at each of both sides of the edge, the surface areas of the corrugations increasing from the abutment edge towards each penetrating end.

The narrowing or abutment or abutment edge in the pipe-connecting part is preferably constituted by a hollow between two corrugations.

Preferably the difference in surface area is obtained by means of different radius of curvature.

Figure 1:
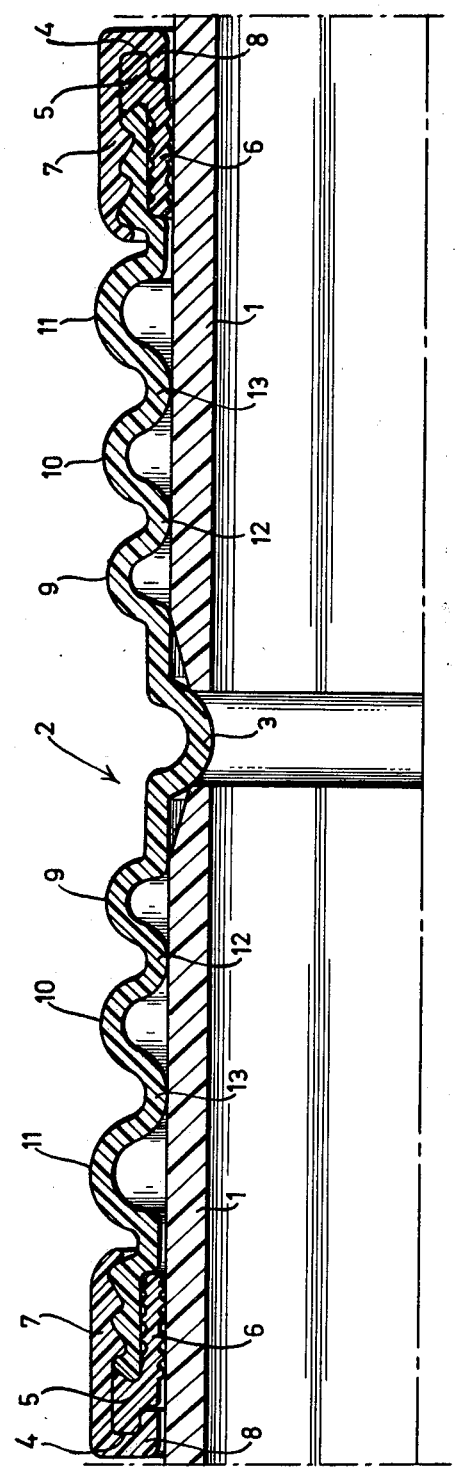
FIG. 1 represents a pipe connection according to the invention in outline.

DESCRIPTION OF A PREFERRED EMBODIMENT:

The FIG. 3 shows a pipe connection of polyvinylchloride comprising two penetrating pipe parts 1 and a pipe-connecting receiving part 2 with two receiving ends. The part 2 is provided with an inner abutment edge 3, which is constituted by a hollow between two corrugations, which is symmetrical with respect to the two ends of the receiving part. On either side of the narrowing or abutment edge 3 are in the vicinity of the ends of the receiving part 2 the recesses 4 in which a rubber sealing 5 with a skirt 6 is accommodated. This skirt 6 with sealing ring 5 is retained by means of a locking ring 7 cooperating with recesses on the outer side, near the penetrating ends of the pipe connecting receiving part 2, the ring 7 having an inwardly bent over channel section end 8.

Between the inner abutment edge 3 and the locking ring 7 are three transverse or helical corrugations 9, 10 and 11. The radii of curvature or heights of these transverse or helical corrugations 9, 10 and 11 increase from the narrowing 3 towards the free end of the pipe-connecting part 2. Thus the radius of curvature for the transverse corrugation 9, amounts to seven for the transverse corrugation 10 it amounts to eight and a halt and for the transverse corrugation 11 it amounts to ten. Transverse corrugations are preferred.

The hollows 12, 13 respectively between the consecutive helical or transverse corrugations have likewise a radius of curvature of increasing size, the radius of curvature of the hollow 12 amounting to three and the radius of curvature of the hollow 13 on the outer side amounting to four and a half. The corrugations have preferably equivalent shapes.

It has been found that an increase of the radius of curvature of the helical or transverse corrugations 9, 10, 11, respectively, gives rise to a considerable improvement of the properties of the pipe-connecting receiving part 2, even when it is manufactured from very thin-walled material.

The penetrating pipe parts 1 consist e.g. of polyethylene, polyvinylchloride, polypropene or ABS materials.

The same materials can be used for manufacturing the pipe-connecting part 2, the locking ring 7, respectively.

The receiving part 2 required for such a pipe connection can be manufactured by deforming an extruded plastic pipe by means of compressed air in the way in which a so-called corrugated pipe is made.

It will be obvious that a receiving part 2 can be divided into two parts along the abutment edge 3 and by removing the inner edge a helically corrugated receiving part can be screwed into another threaded pipe part thereby providing a receiving part for a penetrating pipe part.

Figure 2:
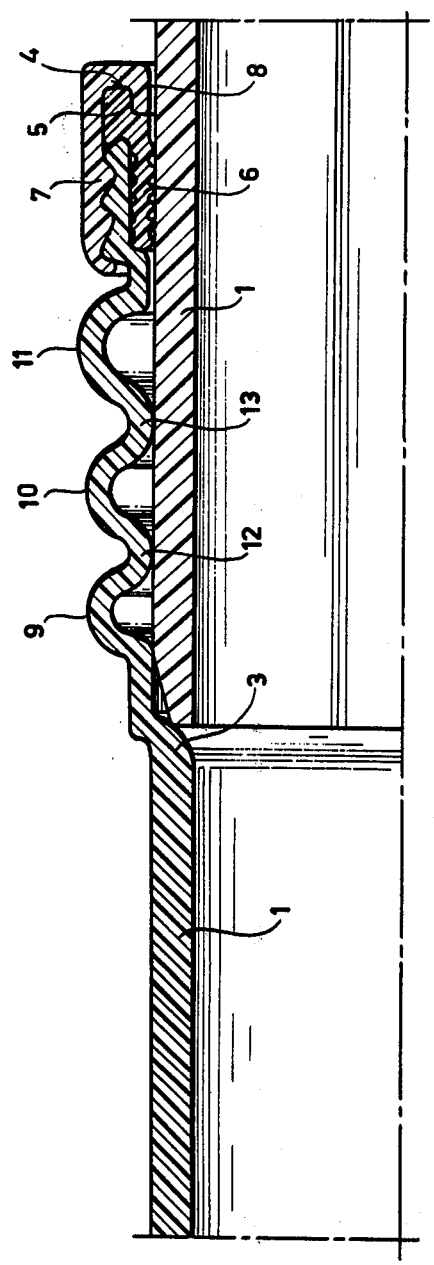
FIG. 2 represents a pipe connection of a tube with a widened end having corrugations according to the invention.

The receiving pipe part can also have a widened end being integral with a plastic pipe as shown in FIG. 2.

What I claim is:

1. Pipe-connection for the ends of plastic pipes comprising a tubular plastic pipe receiving part of preferably thermoplastic material receiving the end of a plastic pipe, said pipe receiving part having a recess in the vicinity of its end, sealing means accommodated in said recess, the receiving part having a substantially uniform wall thickness and at least two continuous annular corrugations being contiguous with the inserted pipe spaced inwardly of said recess, the cross section area of the corrugations between the corrugations and the pipe decreasing from the end of the receiving part, and the corrugations have a different radius of curvature for obtaining the different cross section areas and the inner diameters of the hollows between the corrugations being equal.

2. Pipe-connection according to claim 1, wherein the receiving part has two receiving ends and an inner abutment edge between said two receiving ends.

3. Pipe-connection according to claim 1 wherein the receiving part comprises at least three corrugations adjacent each receiving end thereof.

4. Pipe connection according to claim 1 wherein the abutment edge in the receiving piece comprises an inwardly directed corrugation.

5. Pipe-connection according to claim 1 wherein the receiving pipe part is a widened end of a plastic pipe.

6. Receiving pipe part for a pipe connection for the ends of plastic pipes comprising a tubular element having an abutment edge therein and on both sides of the abutment edge there being at least two continuous annular corrugations, the outer surface thereof increasing from the abutment edge, by different heights, and different radii of curvature of said corrugations and the inner diameters of the hollows between the corrugations being equal.

7. Receiving pipe part for use in a pipe connection according to claim 6, wherein one end of the receiving part is integral with a plastic tube.

* * * * *